United States Patent
Manolakos et al.

(10) Patent No.: US 10,644,851 B2
(45) Date of Patent: May 5, 2020

(54) TRANSMISSION, RECEPTION, AND CONFIGURATION OF A CSIRS WITH A CONFIGURABLE BANDWIDTH

(71) Applicant: QUALCOMM Incorporated, San Diego, CA (US)

(72) Inventors: Alexandros Manolakos, San Diego, CA (US); Chenxi Hao, Beijing (CN); Yu Zhang, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/034,151

(22) Filed: Jul. 12, 2018

(65) Prior Publication Data
US 2019/0052423 A1 Feb. 14, 2019

Related U.S. Application Data

(63) Continuation of application No. PCT/CN2017/097021, filed on Aug. 11, 2017.

(51) Int. Cl.
*H04W 4/00* (2018.01)
*H04L 5/00* (2006.01)
*H04W 72/04* (2009.01)

(52) U.S. Cl.
CPC .......... *H04L 5/0048* (2013.01); *H04L 5/0053* (2013.01); *H04W 72/0453* (2013.01); *H04L 5/0023* (2013.01)

(58) Field of Classification Search
CPC ... H04L 5/0048; H04L 5/0053; H04L 5/0023; H04W 72/0453; H04W 88/04; H04W 72/04
See application file for complete search history.

(56) References Cited

U.S. PATENT DOCUMENTS 8,780,766 B2  7/2014 Chen et al.
2011/0292847 A1* 12/2011 Yoon ..................... H04L 5/0007
370/280

(Continued)

FOREIGN PATENT DOCUMENTS

CN    103684676 A    3/2014
WO   WO-2011152651 A2  12/2011

(Continued)

OTHER PUBLICATIONS

International Search Report and Written Opinion—PCT/CN2017/097021—ISA/EPO—Mar. 30, 2018.

*Primary Examiner* — Abdelnabi O Musa
(74) *Attorney, Agent, or Firm* — Qualcomm IP Dept.; James Hunt Yancey, Jr.

(57) ABSTRACT

Wireless communication that includes transmission, reception, and configuration of a CSIRS with a configurable bandwidth is discussed. A base station/gNB may determine a number of antenna ports to be used for wireless communication. The base station/gNB may allocate a first plurality of frequency resources for the transmission of the CSIRS based on the determined number of antenna ports, and may transmit the CSIRS over the first plurality of frequency resources. A mobile device may receive the CSIRS over the first plurality of frequency resources and estimate at least one of channel quality and interference associated with the first plurality of frequency resources based on the received CSIRS.

30 Claims, 9 Drawing Sheets

(56) References Cited

U.S. PATENT DOCUMENTS

| | | | |
|---|---|---|---|
| 2012/0039220 A1* | 2/2012 | Chen | H04L 5/0053 370/279 |
| 2012/0281567 A1* | 11/2012 | Gao | H04B 7/0626 370/252 |
| 2016/0112167 A1* | 4/2016 | Xu | H04L 5/005 370/329 |
| 2019/0020395 A1* | 1/2019 | Xu | H04B 7/0617 |

FOREIGN PATENT DOCUMENTS

| | | |
|---|---|---|
| WO | WO-2012024320 A1 | 2/2012 |
| WO | WO-2014161145 A1 | 10/2014 |

* cited by examiner

TRANSMISSION, RECEPTION, AND CONFIGURATION OF A CSIRS WITH A CONFIGURABLE BANDWIDTH

CROSS-REFERENCE TO RELATED APPLICATIONS

This application claims the benefit of Application No. PCT/CN2017/097021, entitled "TRANSMISSION, RECEPTION, AND CONFIGURATION OF A CSIRS WITH A CONFIGURABLE BANDWIDTH," filed on Aug. 11, 2017, which is expressly incorporated by reference herein in its entirety.

TECHNICAL FIELD

Aspects of the present disclosure relate generally to wireless communication systems, and more particularly, to transmission, reception, and configuration in wireless communication systems of channel state information reference signals (CSIRSs) that have configurable bandwidths. Certain embodiments of the technology discussed below can enable and provide enhanced communication features and techniques for communication systems, including higher data rates, higher capacity, better spectral efficiency, and lower device power.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. For example, a method can include determining, by a processor, a number of antenna ports to be used for wireless communication. The method can also include allocating, by the processor, a first plurality of frequency resources for the transmission of a CSIRS based on the determined number of antenna ports, and transmitting, by the processor, the CSIRS over the first plurality of frequency resources.

In an additional aspect of the disclosure, an apparatus configured for wireless communication is provided. For example, the apparatus can include means for determining, by a processor, a number of antenna ports to be used for wireless communication. The apparatus can also include means for allocating, by the processor, a first plurality of frequency resources for the transmission of a CSIRS based on the determined number of antenna ports, and means for transmitting, by the processor, the CSIRS over the first plurality of frequency resources.

In an additional aspect of the disclosure, a non-transitory computer-readable medium having program code recorded thereon is provided. The program code can include code to determine a number of antenna ports to be used for wireless communication. The program code can also include code to allocate a first plurality of frequency resources for the transmission of a CSIRS based on the determined number of antenna ports, and code to transmit the CSIRS over the first plurality of frequency resources.

In an additional aspect of the disclosure, an apparatus configured for wireless communication is provided. The apparatus includes at least one processor, and a memory coupled to the processor. The at least one processor can be configured to determine a number of antenna ports to be used for wireless communication. The at least one processor can also be configured to allocate a first plurality of frequency resources for the transmission of a CSIRS based on the determined number of antenna ports, and to transmit the CSIRS over the first plurality of frequency resources.

In one aspect of the disclosure, a method of wireless communication is provided. For example, a method can include receiving, by a processor, a CSIRS over a first plurality of frequency resources, wherein the first plurality of frequency resources over which the CSIRS is received is set based on a number of antenna ports used for wireless communication. In some aspects, the method may also include estimating at least one of channel quality and interference associated with the first plurality of frequency resources based on the received CSIRS.

In an additional aspect of the disclosure, an apparatus configured for wireless communication is provided. For example, the apparatus can include means for receiving, by a processor, a CSIRS over a first plurality of frequency resources, wherein the first plurality of frequency resources over which the CSIRS is received is set based on a number of antenna ports used for wireless communication. In some aspects, the apparatus can also include means for estimating at least one of channel quality and interference associated with the first plurality of frequency resources based on the received CSIRS.

In an additional aspect of the disclosure, a non-transitory computer-readable medium having program code recorded thereon is provided. The program code can include code to receive a CSIRS over a first plurality of frequency resources, wherein the first plurality of frequency resources over which the CSIRS is received is set based on a number of antenna ports used for wireless communication. In some aspects, the program code can also include code to estimate at least one of channel quality and interference associated with the first plurality of frequency resources based on the received CSIRS.

In an additional aspect of the disclosure, an apparatus configured for wireless communication is provided. The apparatus includes at least one processor, and a memory coupled to the processor. The at least one processor can be configured to receive a CSIRS over a first plurality of frequency resources, wherein the first plurality of frequency resources over which the CSIRS is received is set based on a number of antenna ports used for wireless communication. The at least one processor can also be configured to estimate at least one of channel quality and interference associated with the first plurality of frequency resources based on the received CSIRS.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
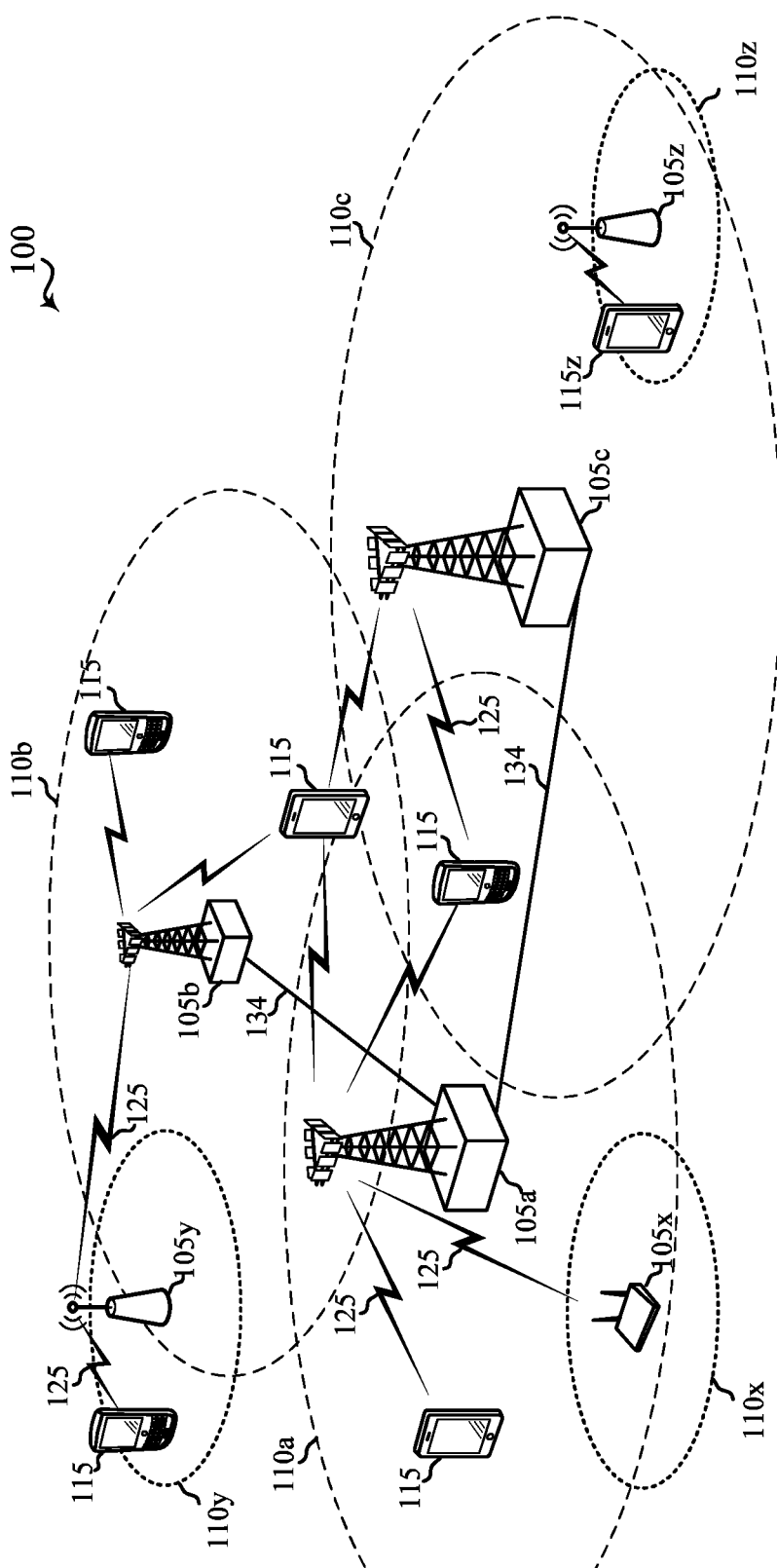
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved U IRA (E-UTRA), IEEE 802.11, IEEE 802.16, IEEE 802.20, flash-OFDM and the like. U IRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. For example, next generation networks (e.g., 5G networks and beyond) are being designed to support features such as high bandwidth operations, as discussed in 3GPP Release 14/15 forward.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells. In next generation networks (e.g., 5G networks and beyond), gNBs may provide communication coverage, similar to the way an eNB may provide communication coverage.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
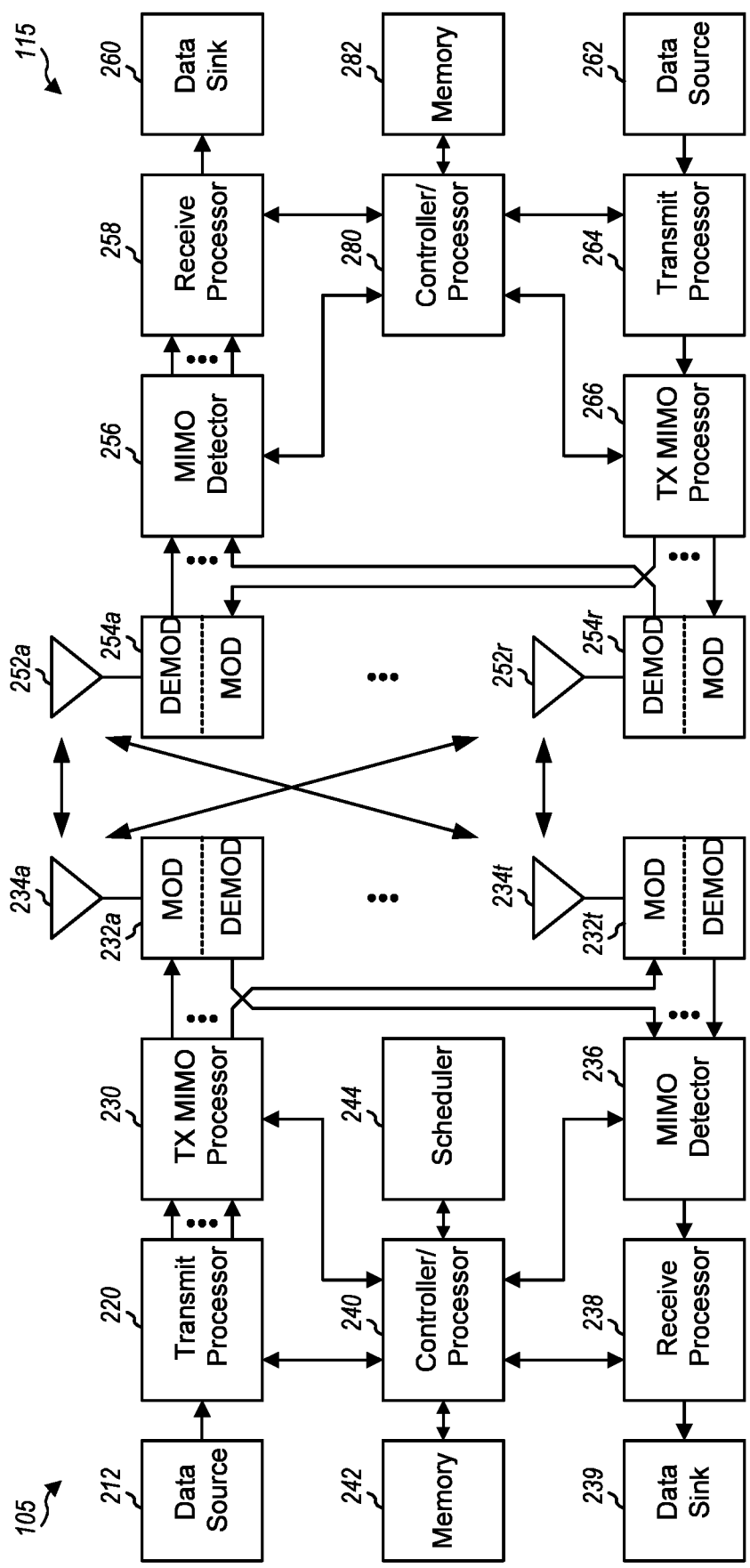
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein. Memories 242 and 282 may store data and program codes for gNB 105 and UE 115, respectively. Scheduler 244 may schedule UEs for data transmission on the downlink and/or uplink.

As illustrated in FIGS. 1-2, various types of control and/or data information may be transmitted and received by the various devices in a wireless communication system. Such control and/or data information may be transmitted over communication channels by specifying the frequency and time (symbol) to be used for the transmission of the control and/or data information. A channel may refer to a combination of frequencies and symbols. Therefore, a channel may be specified by specifying the frequencies and symbols associated with the channel. Some channels may be used exclusively for the transmission of control information or data information, while other channels may be used to transmit data information and control information.

Control information may be transmitted to a mobile device to help the mobile device determine the channel on which data may exist and to help the mobile device determine how to most efficiently receive and process the data. Accordingly, reception of control information is essential to enable efficient operation of a wireless communication system. Factors that typically hinder a mobile device's ability to receive control information include poor channel quality and interference in the channel. Therefore, properly measuring the quality of a channel and the interference in the channel may help a mobile device receive and process control information. In some aspects, channel state information reference signals (CSIRSs) may be transmitted to mobile devices to help mobile devices determine the quality of and/or interference on a channel used to transmit control and/or data information. According to some embodiments, a CSIRS may be a non-zero power CSIRS (NZP-CSIRS) or a zero power CSIRS (ZP-CSIRS).

Figure 3:
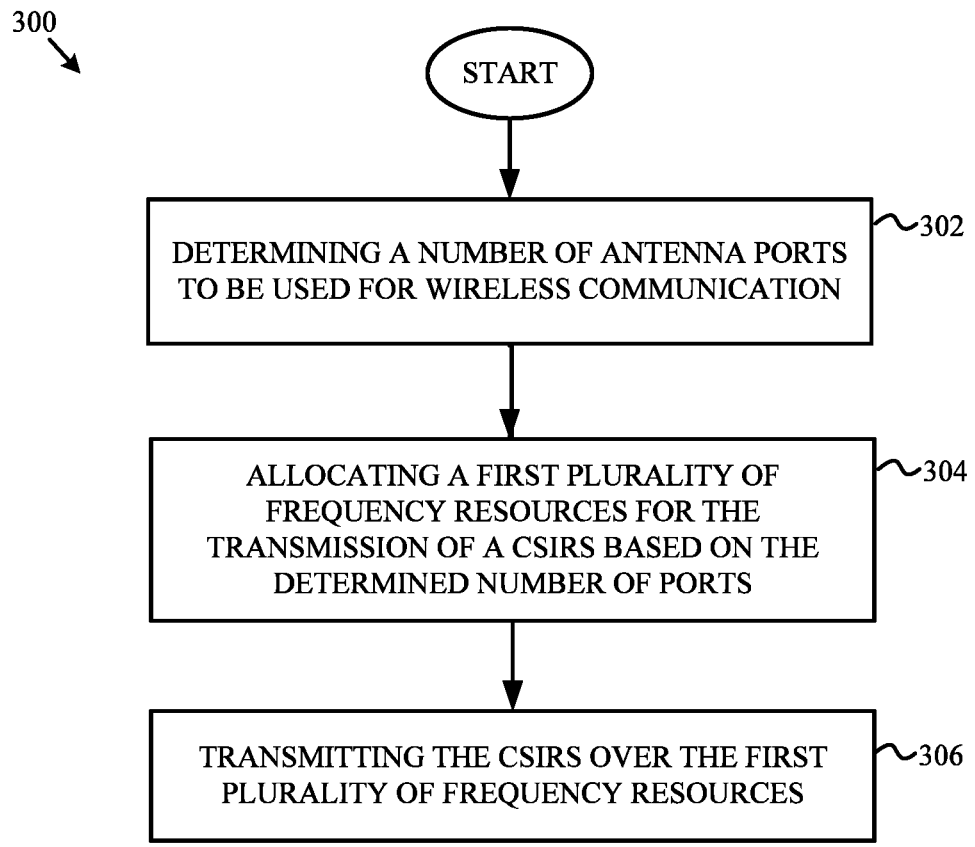
FIG. 3 is a block diagram illustrating a method for configuration and transmission of a CSIRS that has a configurable bandwidth according to some embodiments of the present disclosure.
Figure 7:
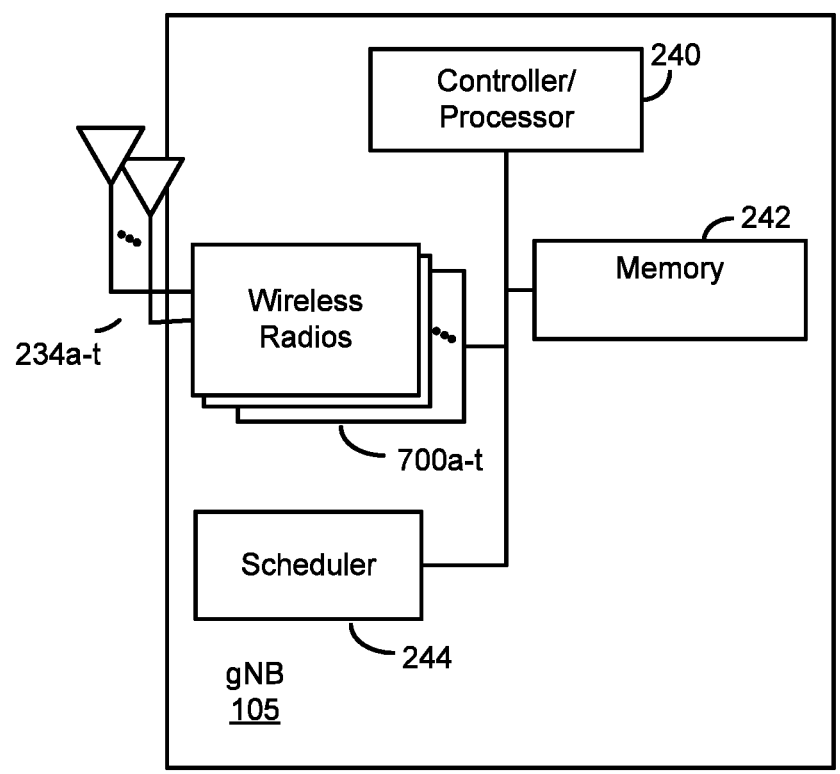
FIG. 7 is a block diagram illustrating an eNB configured according to some embodiments of the present disclosure.

FIG. 3, as an example, is a block diagram illustrating a method for configuration and transmission of a CSIRS that has a configurable bandwidth according to some embodiments of the present disclosure. Aspects of method 300 may be implemented with the aspects of this disclosure described with respect to FIGS. 1-2, 4-5, and 7-8, such as a gNB. The example blocks will also be described with respect to base station 105 as illustrated in FIG. 7. FIG. 7 is a block diagram illustrating a base station configured according to some embodiments of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 700a-t and antennas 234a-t. Wireless radios 700a-t include various components and hardware, as illustrated in FIG. 2 for gNB 105, including modulator/demodulators 232a-t, MIMO detector 236, receive processor 238, transmit processor 220, and TX MIMO processor 230.

Specifically, method 300 includes, at block 302, the step of determining, by a processor, a number of antenna ports to be used for wireless communication. For example, with reference to FIG. 2, controller/processor 240 of gNB 105 may determine the number of antennas 234 to be used for wireless communication. At block 304, method 300 includes the step of allocating, by the processor, a first plurality of frequency resources for the transmission of a CSIRS based on the determined number of antenna ports. At block 306, method 300 includes the step of transmitting, by the processor, the CSIRS over the first plurality of frequency resources. As a specific example, gNB 105 may, under control of controller/processor 240, perform method 300, including determining a number of antenna ports to be used for wireless communication, allocating a first plurality of frequency resources for the transmission of a CSIRS based on the determined number of antenna ports, and transmitting the CSIRS over the first plurality of frequency resources.

Figure 4A:
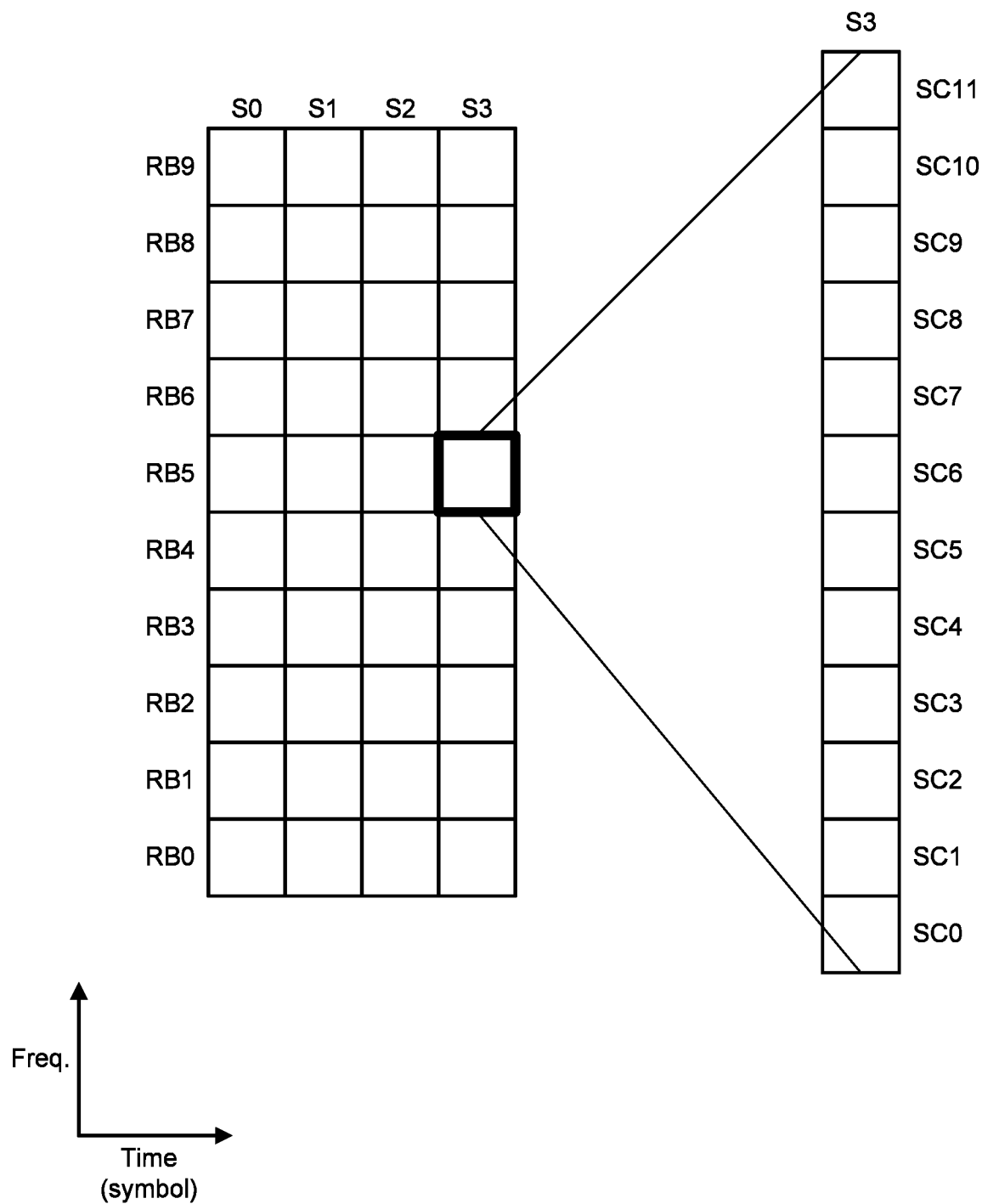
FIG. 4A shows a diagram that illustrates an example structure of channel resources available for wireless communication according to some embodiments of the present disclosure.

To aid the illustration of the allocation of frequency resources described at block 304, FIG. 4A shows a diagram that illustrates an example structure of channel resources available for wireless communication according to some embodiments of the present disclosure. Frequency resources for wireless communications, i.e., transmission and/or reception, may be specified by specifying one or more of the resource blocks (RBs). In FIG. 4A, ten resource blocks RB0-RB9 are illustrated. Therefore, allocation of frequency resources for transmission and/or reception may refer to the allocation of one or more of resource blocks RB0-RB9. Similarly, time resources may be specified by specifying one or more of the symbols. In FIG. 4A, four symbols S0-S3 are illustrated. Therefore, allocation of time resources for transmission and/or reception may refer to the allocation of one or more of symbols S0-S3.

In some aspects, frequency resources may also be specified by specifying frequency resources within a resource block. For example, in FIG. 4A, the frequency resources within the channel resources identified by resource block RB5 and symbol S3 is illustrated in more detail. As illustrated in FIG. 4A, each resource block may include numerous subcarriers (SCs). Each subcarrier SC0-SC11 may correspond to a different frequency or frequency band. Accordingly, each resource block, for example resource block RB5, may include all the frequencies (the frequency band) that are occupied by the subcarriers within the resource block, for example SC0-SC11 for RB5. In some aspects, frequency resources for wireless communications may be specified by specifying one or more of the subcarriers within one or more resource blocks. For example, allocation of frequency resources for transmission and/or reception may refer to the allocation of one or more of subcarriers SC0-SC11 of one resource block and one or more of subcarriers SC0-SC11 of another resource block.

Figure 4B:
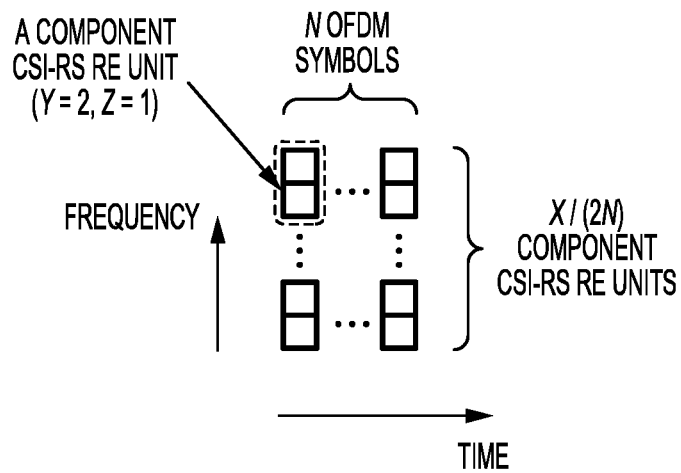
FIGS. 4B and 4C show diagrams that illustrate example allocations of channel resources within a resource block for CSIRS transmission according to some embodiments of the present disclosure.
Figure 4C:
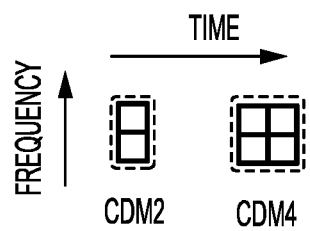

As an example, FIGS. 4B and 4C show diagrams that illustrate the allocation of channel resources within a resource block for CSIRS transmission according to some embodiments of the present disclosure. As illustrated in FIG. 4B, a component CSIRS resource element (RE) unit may refer to 2 contiguous resource elements in the frequency domain. In some embodiments, channel resources within a resource block allocated for a CSIRS may span over $N \in \{1, 2, 4\}$ symbols. In addition, channel resources within a resource block allocated for a CSIRS may include one or more patterns of component CSIRS RE units. As illustrated in FIG. 4B, a component CSIRS RE pattern may be defined within a single resource block as Y adjacent resource elements in the frequency domain and Z adjacent resource elements in the time domain. According to some embodiments, the values of Y and Z may be a function of the code division multiplex (CDM) mode used for wireless communication. FIG. 4C illustrates example component CSIRS RE patterns within resource blocks for various embodiments. For example, FIG. 4C illustrates than in some embodiments in which 2 ports are used for wireless communication, the component CSIRS RE pattern may include two adjacent resource elements in the frequency domain. In some embodiments, the allocation to a CSIRS of resource elements that span 4 symbols may be reserved for the scenario when 32 antenna ports are used for a wireless communication transmission of information. As illustrated in FIG. 4C, the allocation of channel resources within a resource block allocated for the transmission of a CSIRS may include contiguous and/or non-contiguous channel resource elements.

One of skill in the art should readily understand that although a specific number of resource blocks, subcarriers, and symbols are illustrated in FIGS. 4A-C, other amounts of resource blocks, subcarriers, and symbols may also be used for wireless communication without departing from the spirit or scope of the present disclosure. For example, in another embodiment, 100 resource blocks may be available for transmission within a symbol. Similarly other numbers of symbols may be available for communication within a resource block, and other numbers of subcarriers may be included within a resource block.

One of skill in the art should also readily understand that cross-reference to FIG. 4A throughout the present disclosure to discuss various embodiments of the present disclosure is provided only for illustrative purposes, i.e., to illustrate the concepts associated with the various embodiments of the present disclosure. Such cross-referencing to FIG. 4A is not to be construed as a limitation of the embodiments of the present disclosure to the specific parameters illustrated in FIG. 4A. In particular, generally a maximum number of resource blocks (RB_N_max) available for wireless communication within a symbol will be much larger than the ten resource blocks illustrated in FIG. 4A. Similarly, generally the maximum number of symbols (S_N_max) available for wireless communication within a resource block will be much larger than the four symbols illustrated in FIG. 4A.

In some embodiments, the frequencies associated with RB_N_max may specify the entire bandwidth that can be specified within a symbol and therefore available for wireless communication between a gNB and a mobile device within a symbol. According to some embodiments, this bandwidth may be referred to as the component carrier (CC) bandwidth.

According to some embodiments, the bandwidth associated with the entire number of frequency resources available for the transmission of the CSIRS may be less than the CC bandwidth. In other words, the entire CC bandwidth is typically not available for transmission of the CSIRS. For example, in one embodiment, the bandwidth associated with the entire number of frequency resources available for the transmission of the CSIRS may be half the CC bandwidth such that the entire number of frequency resources available for the transmission of the CSIRS may be half of RB_N_max. hi another embodiment, the bandwidth associated with the entire number of frequency resources available for the transmission of the CSIRS may be one tenth of the CC bandwidth such that the entire number of frequency resources available for the transmission of the CSIRS may be one tenth of RB_N_max. According to some embodiments, this bandwidth associated with the entire number of frequency resources available for the transmission of the CSIRS, i.e., the maximum bandwidth over which CSIRS may be transmitted, may be referred to as a bandwidth part (BWP). Therefore, a CC bandwidth may include one or more BWPs. In some embodiments, each BWP may be associated with a specific numerology, such as a specific sub-carrier spacing, a specific frequency location, and/or a specific bandwidth. According to some embodiments, the minimum bandwidth that a BWP may have may be the bandwidth needed for a synchronization signal. In some embodiments, a BWP may span 272 resource blocks.

According to some embodiments, a CSIRS may be transmitted over a bandwidth that spans a BWP. In other embodiments, a CSIRS may be transmitted over a bandwidth that spans a subset of a BWP, i.e., a subset of the number of frequency resources available for the transmission of the CSIRS. In some embodiments, a subset of the BWP that may be used for the transmission of a CSIRS may be referred to as a BWP subband. Accordingly, in some embodiments, a BWP subband may be associated with frequency resources that yield a bandwidth smaller than a BWP. In other embodiments, a BWP subband may be associated with frequency resources that yield a bandwidth as large as the BWP.

Returning to FIG. 3, as described with respect to blocks 302 and 304, the allocation of a first plurality of frequency resources for the transmission of a CSIRS may be based on the determined number of antenna ports. In particular, in one embodiment, a processor within a gNB may be configured to compare the determined number of antenna ports used for wireless communication, such as the number of antenna ports determined at block 302, to a first threshold number of antenna ports. A processor within the gNB may also be configured to determine whether or not the determined number of antenna ports is equal to or less than a first threshold number of antenna ports. In some embodiments, the first threshold number of antenna ports may be a small number, such as 1 or 2 antenna ports. In some embodiments, the frequency resources allocated for the transmission of a CSIRS when the number of antenna ports used for wireless communication is equal to or less than the first threshold number of antenna ports may correspond to the frequency resources of a BWP subband such that the first plurality of frequency resources allocated for the transmission of a CSIRS may correspond to the frequency resources of a BWP subband. In other embodiments, the frequency resources allocated for the transmission of a CSIRS when the number of antenna ports used for wireless communication is equal to or less than the first threshold number of antenna ports may correspond to the frequency resources of a BWP such that the first plurality of frequency resources allocated for the transmission of a CSIRS may correspond to the frequency resources of a BWP.

In some embodiments, K CSIRS transmission subbands may exist within a BWP. According to some embodiments, if a BWP has a bandwidth of 100 MHz and K=10, then a subband may be 10 MHz. In another embodiment, if a BWP has a bandwidth of 50 MHz and K=10, then a subband may be 5 MHz. According to some embodiments, a minimum bandwidth for a CSIRS transmission may depend on sub-carrier spacing. In some embodiments, the minimum bandwidth for a CSIRS transmission may be a bandwidth necessary to achieve a predetermined level of accuracy in the channel quality and/or interference estimation performed by a mobile device. For example, in one embodiment, a DMRS may be transmitted in 4 resource blocks using 12 antenna ports, and minimum channel quality requirements may establish that an associated CSIRS transmitted over 12 antenna ports may not be transmitted in less than 16 resource blocks. Therefore, the CSIRS may be transmitted in frequency resources, e.g., 16 resource blocks, that include the frequency resources used for the DMRS transmission, e.g., 4 resource blocks. Accordingly, in such an embodiment, the frequency resources allocated for the transmission of the CSIRS may not exactly correspond to the frequency resources allocated for the transmission of the DMRS, but at the same time may not span an entire BWP.

According to some embodiments, the first number of antenna ports may correspond to a number of antenna ports used to transmit control information from a gNB to a mobile device because in some embodiments a small number of antenna ports may be used to transmit control information. Therefore, in some embodiments, the channel quality and/or interference associated with the transmission of the control information may be needed by the mobile device. Accordingly, the frequency resources allocated to the CSIRS may be selected to track the frequency resources allocated for the transmission of the control information so that the mobile device may estimate the channel quality and/or interference associated with the transmission of the control information based on processing of the received CSIRS. Therefore, in some embodiments, a processor of the gNB may be configured to determine the frequency resources allocated for the transmission of the control information and be configured to allocate, for the transmission of the CSIRS, those same frequency resources determined to be allocated for the transmission of the control information. In other words, in some embodiments, the step at block 304 of allocating a first plurality of frequency resources for the transmission of a CSIRS may include allocating, for the transmission of the CSIRS, the frequency resources allocated for the transmission of control information when the number of antenna ports is equal to or less than the first threshold number of antenna ports. Accordingly, in some embodiments, the first plurality of frequency resources may include the frequency resources allocated for the transmission of control information when the number of antenna ports is equal to or less than the first threshold number of antenna ports. In some embodiments, the frequency resources allocated for the transmission of control information, and therefore also allocated for the transmission of a CSIRS, may correspond to the frequency resources of a BWP subband such that the first plurality of frequency resources allocated for the transmission of a CSIRS may correspond to the frequency resources of a BWP subband. In other embodiments, the frequency resources allocated for the transmission of control information, and therefore also allocated for the transmission of a CSIRS, may correspond to the frequency resources of a BWP such that the first plurality of frequency resources allocated for the transmission of a CSIRS may correspond to the frequency resources of a BWP.

In some embodiments, a mobile device may be configured to receive a CSIRS over the first plurality of frequency resources and to estimate channel quality and/or interference associated with the first plurality of frequency resources based on the received CSIRS. For example, when the number of antenna ports used for wireless communication is equal to or less than a first threshold number of antenna ports, for example because the information that is being transmitted by the gNB is control information, the first plurality of frequency resources over which the CSIRS is received by the mobile device may correspond to the frequency resources allocated for the transmission of the control information. In other words, the step of receiving a CSIRS over a first plurality of frequency resources, as performed by a mobile device, may include receiving the CSIRS over frequency resources that correspond to the frequency resources allocated for the transmission of the control information. The mobile device may subsequently process the received CSIRS to estimate channel quality and/or interference associated with the transmission of the control information. In other words, the step of estimating the channel quality and/or interference associated with the first plurality of frequency resources based on the received CSIRS may include estimating channel quality and/or interference associated with the transmission of the control information.

To illustrate with reference to FIG. 4A, control information may be designated for transmission over a first set of channel resources that include, for example, resource blocks RB2-RB7 and symbols S1 and S2. Because the information that is being transmitted is control information, a small number of antenna ports, i.e., a number of antenna ports equal to or less than a first threshold number of antenna ports, may be used to transmit the control information. Accordingly, allocating a first plurality of frequency resources for the transmission of a CSIRS based on the determined number of antenna ports, such as at block 304, may include allocating the frequency resources RB2-RB7 for the transmission of the CSIRS. Because the control information is transmitted in symbols S1 and S2, the CSIRS cannot also be transmitted in the symbols S1 and S2. Instead, the CSIRS may be transmitted in frequency resources RB2-RB7 during symbols S0 or S3. In other embodiments, when control information is not being transmitted in symbols S1 and S2, the CSIRS may be transmitted in frequency resources RB2-RB7 in symbols S1 and S2. For example, the CSIRS may be transmitted in frequency resources RB2-RB7 in symbols S1 and S2 when control information is not being transmitted in symbols S1 and S2 to preemptively estimate the channel quality and/or interference that control information may experience when transmitted in upcoming slots in those same frequency and timing resources. On the receiving end, a mobile device being configured to receive a CSIRS over a first plurality of frequency resources may be configured to receive the CSIRS over frequency resources RB2-RB7 when the CSIRS transmission is configured to track the frequency resources used to transmit the control information. Similarly, the mobile device being configured to estimate the channel quality and/or interference associated with the first plurality of frequency resources may include the mobile device being configured to process the CSIRS received over frequency resources RB2-RB7 to estimate the channel quality and/or interference associated with the transmission of the control information over frequency resources RB2-RB7.

Figure 5:
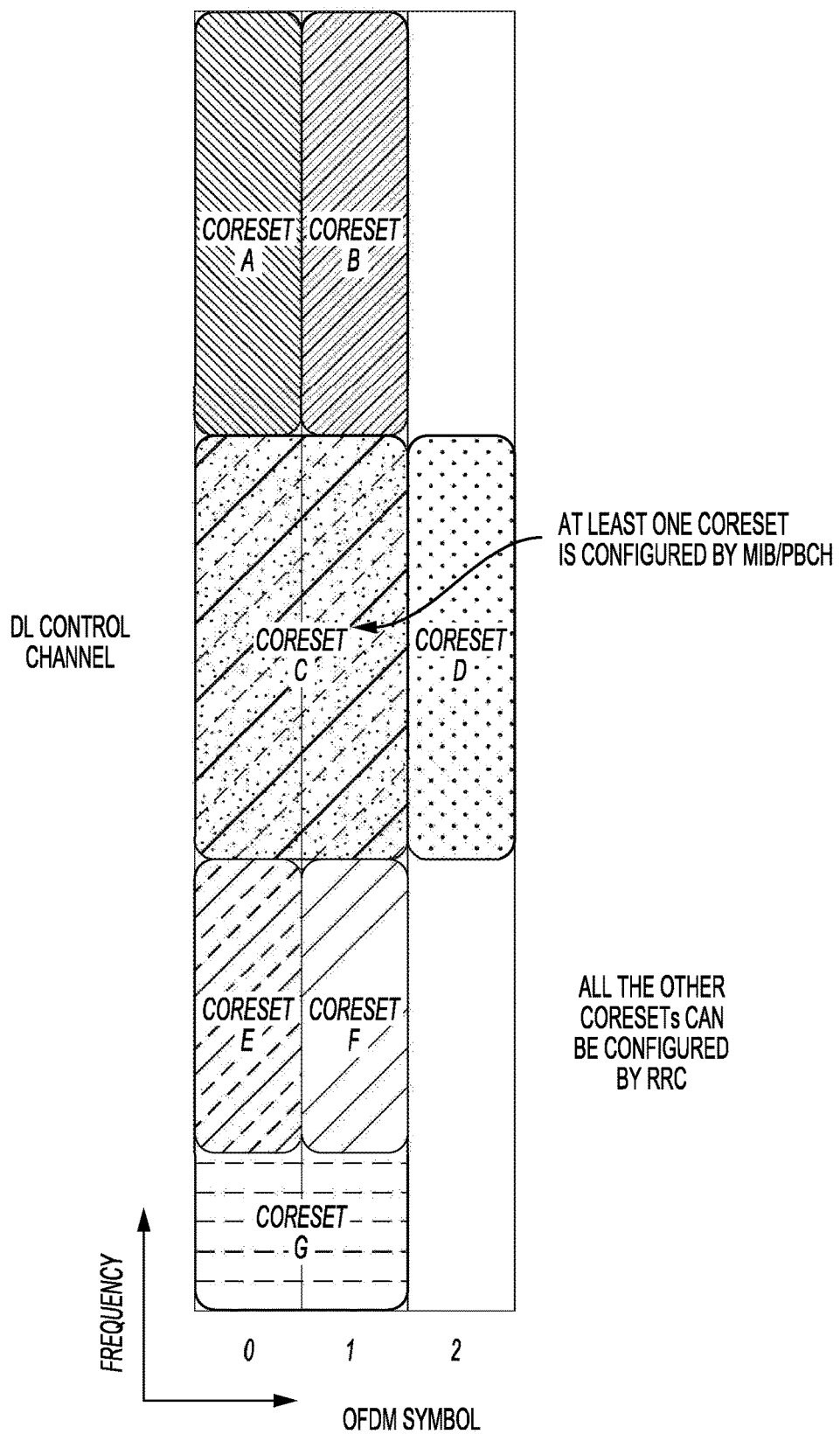
FIG. 5 shows a diagram that illustrates an example of the allocation of channel resources for CORESETs according to some embodiments of the present disclosure.

In some embodiments, control information may be transmitted in a control resource set (CORESET). A CORESET may refer to a set of resource blocks in the frequency domain within which a mobile device may attempt to blindly decode downlink control information. According to some embodiments, the location of at least one CORESET may be obtained by a mobile device through a master information block (MIB), a physical broadcast channel (PBCH), and/or through implicit derivation from initial access communication. In some embodiments, the location of additional CORESETs may be obtained by a mobile device through radio resource control (RRC) signaling/communication. According to some embodiments, a mobile device may be informed by a gNB of both the transmission bandwidth for a CORESET and the transmission bandwidth of the CSIRS. In some embodiments, multiple CORESETs for a mobile device may be overlapped in time and/or frequency. According to some embodiments, a CORESET may span a time duration of one to three symbols when the number of resource blocks used for the CORESET are less than or equal to a predetermined value. In another embodiment, a CORESET may span a time duration of one to two symbols when the number of resource blocks used for the CORESET is greater than the predetermined value. FIG. 5 shows a diagram that illustrates an example of the allocation of channel resources for CORESETs according to some embodiments of the present disclosure.

According to another embodiment, the first number of antenna ports may correspond to a number of antenna ports used to transmit information from a gNB to a mobile device in a data channel having a flexible symbol duration because in some embodiments a small number of antenna ports may be used to transmit information in a flexible data channel having a flexible symbol duration. Such a flexible data channel may refer to a smallest wireless communication scheduling unit in a wireless communication system. According to some embodiments, a flexible data channel may have a duration that is as small as one symbol and as large as the maximum number of symbols that can be used for the communication. For example, the flexible data channel may have a duration of two, four, or seven symbols. In some embodiments, control information may be placed at the beginning (symbol(s)) and/or at the end (symbol(s)) of a flexible data channel. In other embodiments, a flexible data channel may include no control information. According to some embodiments, a flexible data channel may include a pilot in the first symbol, and data in the remaining symbols. In other embodiments, a flexible data channel may have a subcarrier spacing that is different than regular enhanced mobile broadband (eMBB) slots. In some embodiments, control information may be frequency-division multiplexed in a specific portion of a flexible data channel, while in other embodiments control information may be embedded in the flexible data channel.

In some embodiments, the channel quality and/or interference associated with the transmission of the flexible data channel may be needed by the mobile device. Accordingly, the frequency resources allocated to the CSIRS may be selected to track the frequency resources allocated for the transmission of the flexible data channel so that the mobile device may estimate the channel quality and/or interference associated with the transmission of the flexible data channel based on processing of the received CSIRS. Therefore, in some embodiments, a processor of the gNB may be configured to determine the frequency resources allocated for the transmission of the flexible data channel and be configured to allocate, for the transmission of the CSIRS, those same frequency resources determined to be allocated for the transmission of the flexible data channel. In other words, in some embodiments, the step at block 304 of allocating a first plurality of frequency resources for the transmission of a CSIRS may include allocating, for the transmission of the CSIRS, the frequency resources allocated for the transmission of the flexible data channel when the number of antenna ports is equal to or less than the first threshold number of antenna ports. Accordingly, in some embodiments, the first plurality of frequency resources may include the frequency resources allocated for the transmission of the flexible data channel when the number of antenna ports is equal to or less than the first threshold number of antenna ports. In some embodiments, the frequency resources allocated for the transmission of the flexible data channel, and therefore also allocated for the transmission of a CSIRS, may correspond to the frequency resources of a BWP subband such that the first plurality of frequency resources allocated for the transmission of a CSIRS may correspond to the frequency resources of a BWP subband. In other embodiments, the frequency resources allocated for the transmission of the flexible data channel, and therefore also allocated for the transmission of a CSIRS, may correspond to the frequency resources of a BWP such that the first plurality of frequency resources allocated for the transmission of a CSIRS may correspond to the frequency resources of a BWP.

In some embodiments, when the number of antenna ports used for wireless communication is equal to or less than a first threshold number of antenna ports, for example because the information that is being transmitted by the gNB is being transmitted in a flexible data channel, the first plurality of frequency resources over which the CSIRS is received by the mobile device may correspond to the frequency resources allocated for the transmission of the flexible data channel. In other words, the step of receiving a CSIRS over a first plurality of frequency resources, as performed by a mobile device, may include receiving the CSIRS over frequency resources that correspond to the frequency resources allocated for the transmission of the flexible data channel. The mobile device may subsequently process the received CSIRS to estimate channel quality and/or interference associated with the transmission of the flexible data channel. In other words, the step of estimating the channel quality and/or interference associated with the first plurality of frequency resources based on the received CSIRS may include estimating channel quality and/or interference associated with the transmission of the flexible data channel.

To illustrate with reference to FIG. 4A, a flexible data channel may be designated for transmission over a first set of channel resources that include, for example, resource blocks RB1-RB9 and symbol S1. Because the information is being transmitted in a flexible data channel, a small number of antenna ports, i.e., a number of antenna ports equal to or less than a first threshold number of antenna ports, may be used to transmit the flexible data channel. Accordingly, allocating a first plurality of frequency resources for the transmission of a CSIRS based on the determined number of antenna ports, such as at block 304, may include allocating the frequency resources RB1-RB9 for the transmission of the CSIRS. Because the flexible data channel is transmitted in symbol S1, the CSIRS cannot also be transmitted in the symbol S1. Instead, the CSIRS may be transmitted in frequency resources RB1-RB9 during symbols S0, S2, and/or S3. On the receiving end, a mobile device being configured to receive a CSIRS over a first plurality of frequency resources may be configured to receive the CSIRS over frequency resources RB1-RB9 when the CSIRS transmission is configured to track the frequency resources used to transmit the flexible data channel. Similarly, the mobile device being configured to estimate the channel quality and/or interference associated with the first plurality of frequency resources may include the mobile device being configured to process the CSIRS received over frequency resources RB1-RB9 to estimate the channel quality and/or interference associated with the transmission of the flexible data channel over frequency resources RB1-RB9.

In some embodiments, a processor within a gNB may, in addition to being configured to compare the determined number of antenna ports used for wireless communication to a first threshold number of antenna ports, also be configured to compare the determined number of antenna ports used for wireless communication to a second threshold number of antenna ports. A processor within the gNB may also be configured to determine whether or not the determined number of antenna ports is greater than the first threshold number of antenna ports and equal to or less than the second threshold number of antenna ports. In some embodiments, the second threshold number of antenna ports may refer to a number of antenna ports greater than 2 but equal to or less than 12. In some embodiments, the frequency resources allocated for the transmission of a CSIRS when the number of antenna ports used for wireless communication is greater than the first threshold number of antenna ports and equal to or less than the second threshold number of antenna ports may correspond to the frequency resources of a BWP subband such that the first plurality of frequency resources allocated for the transmission of a CSIRS may correspond to the frequency resources of a BWP subband. In other embodiments, the frequency resources allocated for the transmission of a CSIRS when the number of antenna ports used for wireless communication is greater than the first threshold number of antenna ports and equal to or less than the second threshold number of antenna ports may correspond to the frequency resources of a BWP such that the first plurality of frequency resources allocated for the transmission of a CSIRS may correspond to the frequency resources of a BWP.

According to some embodiments, the number of antenna ports to be used for wireless communication, for example as determined at block 302, may correspond to a number of antenna ports used to transmit a demodulation reference signal (DMRS) from a gNB to a mobile device and the second threshold number of antenna ports may correspond to a maximum number of antenna ports that may be used to transmit a DMRS, which as described before may be a number greater than 2 but equal to or less than 12. In some embodiments, the maximum number of antenna ports available for a DMRS transmission may be determined based on a configuration of the DMRS. In other words, the maximum number of antenna ports that may be used to transmit a DMRS may vary depending on a DMRS configuration. For example, in a first DMRS configuration, the maximum number of antenna ports available for a DMRS transmission may be 8 antenna ports, while in a second DMRS configuration, the maximum number of antenna ports available for a DMRS transmission may be 12 antenna ports.

In some embodiments, the channel quality and/or interference associated with the transmission of the DMRS may be needed by the mobile device. Accordingly, the frequency resources allocated to the CSIRS may be selected to track the frequency resources allocated for the transmission of the DMRS so that the mobile device may estimate the channel quality and/or interference associated with the transmission of the DMRS based on processing of the received CSIRS. Therefore, in some embodiments, a processor of the gNB may be configured to determine the frequency resources allocated for the transmission of the DMRS and be configured to allocate, for the transmission of the CSIRS, those same frequency resources determined to be allocated for the transmission of the DMRS. In other words, in some embodiments, the step at block 304 of allocating a first plurality of frequency resources for the transmission of a CSIRS may include allocating, for the transmission of the CSIRS, the frequency resources allocated for the transmission of the DMRS when the number of antenna ports corresponds to the number of antenna ports used to transmit the DMRS and is therefore greater than the first threshold number of antenna ports and equal to or less than the second threshold number of antenna ports. Accordingly, in some embodiments, the first plurality of frequency resources may include the frequency resources allocated for the transmission of the DMRS when the number of antenna ports is greater than the first threshold number of antenna ports and equal to or less than the second threshold number of antenna ports. In some embodiments, the frequency resources allocated for the transmission of the DMRS, and therefore also allocated for the transmission of a CSIRS, may correspond to the frequency resources of a BWP subband such that the first plurality of frequency resources allocated for the transmission of a CSIRS may correspond to the frequency resources of a BWP subband. In other embodiments, the frequency resources allocated for the transmission of the DMRS, and therefore also allocated for the transmission of a CSIRS, may correspond to the frequency resources of a BWP such that the first plurality of frequency resources allocated for the transmission of a CSIRS may correspond to the frequency resources of a BWP.

In some embodiments, when the number of antenna ports used for wireless communication is greater than the first threshold number of antenna ports and equal to or less than the second threshold number of antenna ports, for example because a DMRS is being transmitted by the gNB, the first plurality of frequency resources over which the CSIRS is received by the mobile device may correspond to the frequency resources allocated for the transmission of the DMRS. In other words, the step of receiving a CSIRS over a first plurality of frequency resources, as performed by a mobile device, may include receiving the CSIRS over frequency resources that correspond to the frequency resources allocated for the transmission of the DMRS. The mobile device may subsequently process the received CSIRS to estimate channel quality and/or interference associated with the transmission of the DMRS. In other words, the step of estimating the channel quality and/or interference associated with the first plurality of frequency resources based on the received CSIRS may include estimating channel quality and/or interference associated with the transmission of the DMRS.

In one example, the second threshold number of antenna ports may be 12 ports. Accordingly, an associated CSIRS may also be transmitted using 12 ports, and may be transmitted using a higher granularity of frequency resources than was used for the transmission of the DMRS or the same granularity of frequency resources as was used for the transmission of the DMRS. For example, in one embodiment, the associated CSIRS may be transmitted in only frequency resources, e.g., 16 resource blocks, that exactly match the frequency resources, e.g., 16 resource blocks, allocated for the DMRS transmission. In another embodiment, the associated CSIRS may be transmitted in more than 12 ports, and therefore may not be transmitted in the exact same frequency resources that were allocated for the DMRS transmission, instead being transmitted in frequency resources that span the entire BWP.

To illustrate with reference to FIG. 4A, a DMRS may be designated for transmission over a first set of channel resources that include, for example, resource blocks RB0-RB4 and symbol S2. Because the DMRS is being transmitted, the number of antenna ports used for the transmission of the DMRS may be a number of antenna ports that is greater than the first threshold number of antenna ports and equal to or less than the second threshold number of antenna ports. Accordingly, allocating a first plurality of frequency resources for the transmission of a CSIRS based on the determined number of antenna ports, such as at block 304, may include allocating the frequency resources RB0-RB4 for the transmission of the CSIRS. Because the DMRS is transmitted in symbol S2, the CSIRS cannot also be transmitted in symbol S2. Instead, the CSIRS may be transmitted in frequency resources RB0-RB4 during symbols S0, S1, and/or S3. On the receiving end, a mobile device being configured to receive a CSIRS over a first plurality of frequency resources may be configured to receive the CSIRS over frequency resources RB0-RB4 when the CSIRS transmission is configured to track the frequency resources used to transmit the DMRS. Similarly, the mobile device being configured to estimate the channel quality and/or interference associated with the first plurality of frequency resources may include the mobile device being configured to process the CSIRS received over frequency resources RB0-RB4 to estimate the channel quality and/or interference associated with the transmission of the DMRS over frequency resources RB0-RB4.

According to some embodiments, the number of antenna ports to be used for wireless communication, for example as determined at block 302, may exceed the second threshold number of antenna ports, e.g., the maximum number of antenna ports that may be used to transmit a DMRS from a gNB to a mobile device. In such a situation, the CSIRS may be transmitted over the entire number of frequency resources available for the transmission of a CSIRS. Therefore, in some embodiments, the channel quality and/or interference associated with the entire number of frequency resources available for the transmission of the CSIRS may be needed by the mobile device. Accordingly, the frequency resources allocated to the CSIRS may correspond to the entire number of frequency resources available for the transmission of the CSIRS so that the mobile device may estimate the channel quality and/or interference associated with the entire number of frequency resources available for the transmission of the CSIRS based on processing of the received CSIRS. Therefore, in some embodiments, a processor of the gNB may be configured to allocate, for the transmission of the CSIRS, the entire number of frequency resources available for the transmission of the CSIRS. In other words, in some embodiments, the step at block 304 of allocating a first plurality of frequency resources for the transmission of a CSIRS may include allocating, for the transmission of the CSIRS, the entire number of frequency resources available for the transmission of the CSIRS when the number of antenna ports is greater than the second threshold number of antenna ports. Accordingly, in some embodiments, the first plurality of frequency resources may include all of the frequency resources available for the transmission of the CSIRS when the number of antenna ports is greater than the second threshold number of antenna ports. In some embodiments, the entire number of frequency resources available for the transmission of the CSIRS may correspond to the frequency resources of a BWP such that the first plurality of frequency resources allocated for the transmission of a CSIRS may correspond to the frequency resources of a BWP. According to some embodiments, when the entire number of frequency resources available for the transmission of the CSIRS, e.g., the frequency resources of a BWP, are allocated for the transmission of the CSIRS, such as when a number of antenna ports that exceeds the maximum number of antenna ports that may be used to transmit a DMRS from a gNB to a mobile device are used for wireless communication, the frequency resources allocated for the transmission of the CSIRS may also include the frequency resources allocated for the transmission of other information transmitted within the BWP but in other symbols, such as control information, information in a flexible data channel, DMRS information, etc.

In some embodiments, when the number of antenna ports used for wireless communication is greater than the second threshold number of antenna ports, the first plurality of frequency resources over which the CSIRS is received by the mobile device may correspond to the entire number of frequency resources available for the transmission of the CSIRS. In other words, the step of receiving a CSIRS over a first plurality of frequency resources, as performed by a mobile device, may include receiving the CSIRS over frequency resources that correspond to the entire number of frequency resources available for the transmission of the CSIRS. The mobile device may subsequently process the received CSIRS to estimate channel quality and/or interference associated with the entire number of frequency resources available for the transmission of the CSIRS. In other words, the step of estimating the channel quality and/or interference associated with the first plurality of frequency resources based on the received CSIRS may include estimating channel quality and/or interference associated with the entire number of frequency resources available for the transmission of the CSIRS.

To illustrate with reference to FIG. 4A, wireless communication may be designated for transmission using a number of antenna ports that is greater than the second threshold number of antenna ports. Accordingly, a CSIRS may be transmitted over an entire number of frequency resources available for the transmission of the CSIRS, resources that include, for example, resource blocks RB0-RB4 within symbols S0 and S1. Accordingly, allocating a first plurality of frequency resources for the transmission of a CSIRS based on the determined number of antenna ports, such as at block 304, may include allocating the frequency resources RB0-RB4 for the transmission of the CSIRS. On the receiving end, a mobile device being configured to receive a CSIRS over a first plurality of frequency resources may be configured to receive the CSIRS over frequency resources RB0-RB4 when the number of antenna ports to be used for wireless communication is a number greater than the second threshold number of antenna ports. Similarly, the mobile device being configured to estimate the channel quality and/or interference associated with the first plurality of frequency resources may include the mobile device being configured to process the CSIRS received over frequency resources RB0-RB4 to estimate the channel quality and/or interference associated with the transmission of the CSIRS over frequency resources RB0-RB4.

The above cross-references to FIG. 4A to illustrate various embodiments of the present disclosure illustrate that the frequency resources allocated for the transmission of the CSIRS may be contiguous frequency resources. However, in other embodiments, the frequency resources need not be contiguous frequency resources. That is, in some embodiments, the frequency resources allocated for the transmission of a CSIRS may be distributed in the frequency domain to track and/or match the distribution of frequency resources allocated for the transmission of other information, such as control information, information in a flexible data channel, DMRS information, etc. For example, in other embodiments in which control information, e.g., a CORESET, is transmitted in frequency resources RB2-RB3 and RB6-RB7 such that the frequency resources allocated for the transmission of the control information are not contiguous, the frequency resources allocated for the associated transmission of the CSIRS may also include frequency resources RB2-RB3 and RB6-RB7 such that the frequency resources allocated for the transmission of the CSIRS are also not contiguous. In another embodiment in which a DMRS is transmitted in frequency resources RB3-RB5 and RB7-RB9 such that the frequency resources allocated for the transmission of the DMRS are not contiguous, the frequency resources allocated for the associated transmission of the CSIRS may also include frequency resources RB3-RB5 and RB7-RB9 such that the frequency resources allocated for the transmission of the CSIRS are also not contiguous.

In general, frequency resources allocated for the transmission of a CSIRS may be contiguous, non-contiguous, frequency-division-multiplexed, or embedded within an RB. Examples of contiguous and non-contiguous allocation of frequency resources was previously described. An example of frequency-division multiplexed allocation of the frequency resources for the transmission of the CSIRS may include allocating, within a single symbol, a first set of frequency resources for data, another set of frequency resources for the CSIRS, then another set of frequency resources for data again, then another set of frequency resources for CSIRS again, and so on. An example of embedded allocation of frequency resources for the transmission of the CSIRS may include allocating, within a single RB of a single symbol, a first set of subcarriers for data, another set of subcarriers for the CSIRS, another set of subcarriers for control information, then another set of subcarriers for data again, then another set of subcarriers for CSIRS again, then another set of subcarriers for control information again, and so on.

One of skill in the art should readily recognize that although the first threshold number of antenna ports and the second threshold number of antenna ports have been associated with specific numerical values, the values of the first threshold number of antenna ports and the second threshold number of antenna ports are not limited to the specified numerical values. However, one requirement on the values of the first threshold number of antenna ports and the second threshold number of antenna ports may be that the second threshold number of antenna ports be a larger number than the first threshold number of antenna ports.

As disclosed herein, the number and location of frequency resources allocated by a gNB for the transmission of a CSIRS may be established based on the number of antenna ports used for wireless communication. For example, as disclosed herein, when a small number of antenna ports are used for wireless communication, such as 1 or 2 antenna ports when, for example, control information is being communicated in a CORESET, a gNB may have more flexibility in determining the number and location of frequency resources to allocate for the transmission of the CSIRS than when a large number of antenna ports are used for wireless communication, such as a number of antenna ports that exceeds the maximum number of antenna ports that may be used to transmit a DMRS from a gNB to a mobile device.

As a specific example, when a number of antenna ports less than or equal to the maximum number of antenna ports that may be used to transmit a DMRS from a gNB to a mobile device are used for wireless communication, the number and location of frequency resources that may be allocated for the transmission of the CSIRS may vary depending on the information that is being transmitted, e.g., control information, information in a flexible data channel, DMRS information, etc. For example, 12, 16, 24, 32, 64, etc. resource blocks may be allocated for the transmission of the CSIRS when a number of antenna ports less than or equal to the maximum number of antenna ports that may be used to transmit a DMRS from a gNB to a mobile device are used for wireless communication. In particular, as disclosed herein, when a number of antenna ports less than or equal to the maximum number of antenna ports that may be used to transmit a DMRS from a gNB to a mobile device are used for wireless communication, the specific number and location of frequency resources allocated for the transmission of the CSIRS may be selected to track and/or match the frequency resources allocated for the transmission of other information, such as control information, information in a flexible data channel, DMRS information, etc.

By contrast, when a number of antenna ports that exceeds the maximum number of antenna ports that may be used to transmit a DMRS from a gNB to a mobile device are used for wireless communication, a gNB may have little or no flexibility in setting the number and location of frequency resources that may be allocated for the transmission of the CSIRS. In particular, as disclosed herein, when a number of antenna ports that exceeds the maximum number of antenna ports that may be used to transmit a DMRS from a gNB to a mobile device are used for wireless communication, the gNB may allocate for the transmission of the CSIRS the entire number of frequency resources available for transmission of the CSIRS, e.g., the entire BWP.

Figure 6:
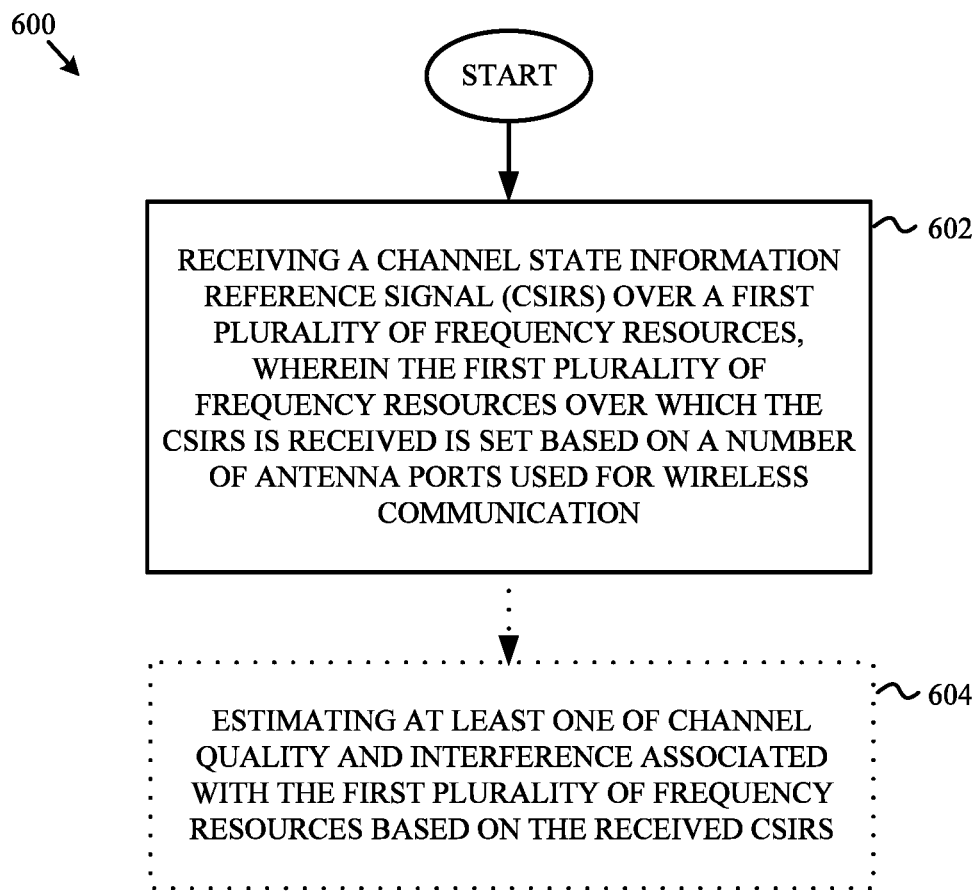
FIG. 6 is a block diagram illustrating a method for reception of a CSIRS that has a configurable bandwidth and estimation of channel quality and/or interference based on the received CSIRS according to some embodiments of the present disclosure.
Figure 8:
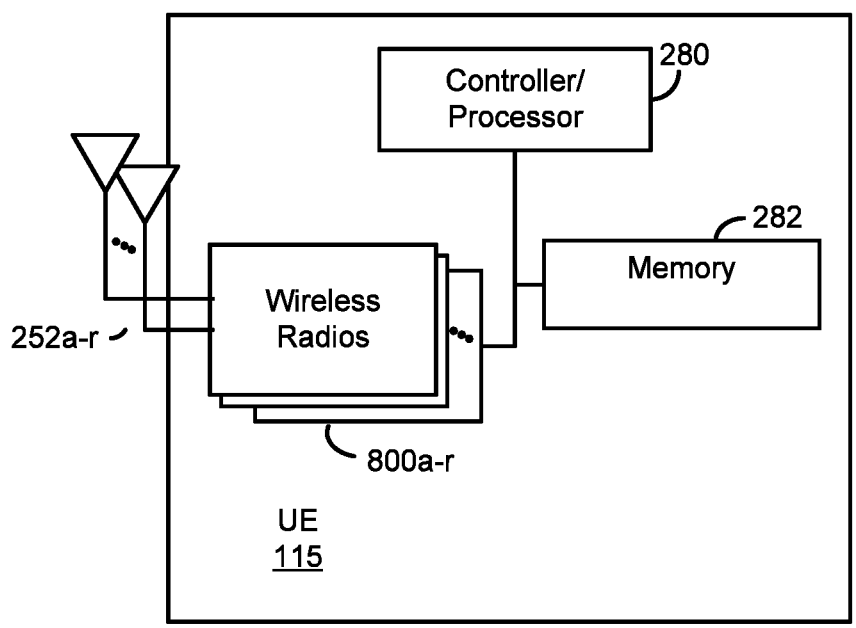
FIG. 8 is a block diagram illustrating a UE configured according to some embodiments of the present disclosure.

FIG. 6 is a block diagram illustrating a method for reception of a CSIRS that has a configurable bandwidth and estimation of channel quality and/or interference based on the received CSIRS according to some embodiments of the present disclosure. Aspects of method 600 may be implemented with the aspects of this disclosure described with respect to FIGS. 1-2, 4-5, and 7-8, such as a mobile device. The example blocks will also be described with respect to UE 115 as illustrated in FIG. 8. FIG. 8 is a block diagram illustrating a UE configured according to some embodiments of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r include various components and hardware, as illustrated in FIG. 2 for UE 115, including modulator/demodulators 254a-r, MIMO detector 256, receive processor 258, transmit processor 264, and TX MIMO processor 266.

Specifically, method 600 includes, at block 602, the step of receiving, by a processor, a channel state information reference signal (CSIRS) over a first plurality of frequency resources, wherein the first plurality of frequency resources over which the CSIRS is received is set based on a number of antenna ports used for wireless communication. In some embodiments, method 600 may also include, at block 604, estimating at least one of channel quality and interference associated with the first plurality of frequency resources based on the received CSIRS. As a specific example, UE 115 may, under control of controller/processor 280, perform method 600, including receiving a CSIRS over a first plurality of frequency resources, wherein the first plurality of frequency resources over which the CSIRS is received is set based on a number of antenna ports used for wireless communication, and estimating at least one of channel quality and interference associated with the first plurality of frequency resources based on the received CSIRS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
determining, by a processor, a number of antenna ports to be used for wireless communication;
determining, by the processor, whether the number of antenna ports is equal to or less than a first threshold number of antenna ports;
determining, by the processor, frequency resources allocated for transmission of control information;
allocating, by the processor, a first plurality of frequency resources for transmission of a channel state information reference signal (CSIRS) based on the determined number of antenna ports and the frequency resources allocated for the transmission of control information by setting the resources of the first plurality of frequency resources to include or correspond to the frequency resources allocated for the transmission of control information when the number of antenna ports is equal to or less than the first threshold number of antenna ports; and
transmitting, by the processor, the CSIRS over the first plurality of frequency resources.

2. The method of claim 1, further comprising:
determining whether the number of antenna ports is equal to or less than a second threshold number of antenna ports;
determining frequency resources allocated for transmission of a data channel having a flexible symbol duration; and
allocating the first plurality of frequency resources for transmission of the CSIRS based on the determined number of antenna ports and the frequency resources allocated for the transmission of the flexible data channel by setting the first plurality of frequency resources to include or correspond to the frequency resources allocated for the transmission of the flexible data channel when the number of antenna ports is equal to or less than the second threshold number of antenna ports.

3. The method of claim 1, further comprising:
setting the first plurality of frequency resources to correspond to the frequency resources allocated for the transmission of control information when the number of antenna ports is equal to or less than the first threshold number of antenna ports.

4. The method of claim 1, further comprising:
determining whether the number of antenna ports is greater than the first threshold number of antenna ports and equal to or less than a second threshold number of antenna ports;
determining frequency resources allocated for transmission of a demodulation reference signal (DMRS); and
allocating the first plurality of frequency resources for transmission of the CSIRS based on the determined number of antenna ports and the frequency resources allocated for the transmission of the DMRS by setting the first plurality of frequency resources to include or correspond to the frequency resources allocated for the transmission of the DMRS when the number of antenna ports is greater than the first threshold number of antenna ports and equal to or less than the second threshold number of antenna ports.

5. The method of claim 4, wherein the number of antenna ports corresponds to the number of antenna ports used for the transmission of the DMRS.

6. The method of claim 5, wherein the second threshold number of antenna ports corresponds to a maximum number of antenna ports available for a DMRS transmission, and wherein the maximum number of antenna ports available for a DMRS transmission is determined based on a configuration of the DMRS.

7. The method of claim 4, further comprising:
determining whether the number of antenna ports is greater than the second threshold number of antenna ports; and
allocating the first plurality of frequency resources for transmission of the CSIRS based on the determined number of antenna ports and the frequency resources allocated for the transmission of the DMRS by setting the first plurality of frequency resources to include or correspond to an entire number of frequency resources available for transmission of the CSIRS when the number of antenna ports is greater than the second threshold number of antenna ports.

8. The method of claim 1, wherein the first plurality of frequency resources are a subset of a number of frequency resources available for transmission of the CSIRS.

9. The method of claim 1, wherein the first plurality of frequency resources are contiguous frequency resources.

10. An apparatus configured for wireless communication, comprising at least one processor coupled to a memory, wherein the apparatus also comprises:
means for determining a number of antenna ports to be used for wireless communication;
means for determining whether the number of antenna ports is equal to or less than a first threshold number of antenna ports;
means for determining frequency resources allocated for transmission of control information;
means for allocating a first plurality of frequency resources for transmission of a channel state information reference signal (CSIRS) based on the determined number of antenna ports and the frequency resources allocated for the transmission of control information by setting the resources of the first plurality of frequency resources to include or correspond to the frequency resources allocated for the transmission of control information when the number of antenna ports is equal to or less than the first threshold number of antenna ports; and
means for transmitting the CSIRS over the first plurality of frequency resources.

11. The apparatus of claim 10, further comprising:
means for determining whether the number of antenna ports is equal to or less than a second threshold number of antenna ports;
means for determining frequency resources allocated for transmission of a data channel having a flexible symbol duration; and
means for allocating the first plurality of frequency resources for transmission of the CS IRS based on the determined number of antenna ports and the frequency resources allocated for the transmission of the flexible data channel by setting the first plurality of frequency resources to include or correspond to the frequency resources allocated for the transmission of the flexible data channel when the number of antenna ports is equal to or less than the second threshold number of antenna ports.

12. The apparatus of claim 10, further comprising:
means for setting the first plurality of frequency resources to correspond to the frequency resources allocated for the transmission of control information when the number of antenna ports is equal to or less than the first threshold number of antenna ports.

13. The apparatus of claim 10, further comprising:
means for determining whether the number of antenna ports is greater than the first threshold number of antenna ports and equal to or less than a second threshold number of antenna ports;
means for determining frequency resources allocated for transmission of a demodulation reference signal (DMRS); and
means for allocating the first plurality of frequency resources for transmission of the CS IRS based on the determined number of antenna ports and the frequency resources allocated for the transmission of the DMRS by setting the first plurality of frequency resources to include or correspond to the frequency resources allocated for the transmission of the DMRS when the number of antenna ports is greater than the first threshold number of antenna ports and equal to or less than the second threshold number of antenna ports.

14. The apparatus of claim 13, wherein the number of antenna ports corresponds to the number of antenna ports used for the transmission of the DMRS.

15. The apparatus of claim 14, wherein the second threshold number of antenna ports corresponds to a maximum number of antenna ports available for a DMRS transmission, and wherein the maximum number of antenna ports available for a DMRS transmission is determined based on a configuration of the DMRS.

16. The apparatus of claim 13, further comprising:
means for determining whether the number of antenna ports is greater than the second threshold number of antenna ports; and
means for allocating the first plurality of frequency resources for transmission of the CS IRS based on the determined number of antenna ports and the frequency resources allocated for the transmission of the DMRS by setting the first plurality of frequency resources to include or correspond to an entire number of frequency resources available for transmission of the CS IRS when the number of antenna ports is greater than the second threshold number of antenna ports.

17. A non-transitory computer-readable medium having program code recorded thereon, the program code including:
program code for causing a computer to determine a number of antenna ports to be used for wireless communication;
program code for causing a computer to determine whether the number of antenna ports is equal to or less than a first threshold number of antenna ports;
program code for causing a computer to determine frequency resources allocated for transmission of control information;
program code for causing a computer to allocate a first plurality of frequency resources for transmission of a channel state information reference signal (CS IRS) based on the determined number of antenna ports and the frequency resources allocated for the transmission of control information by setting the resources of the first plurality of frequency resources to include or correspond to the frequency resources allocated for the transmission of control information when the number of antenna ports is equal to or less than the first threshold number of antenna ports; and program code for causing a computer to transmit the CSIRS over the first plurality of frequency resources.

18. The non-transitory computer-readable medium of claim 17, further comprising:
program code for causing a computer to determine whether the number of antenna ports is equal to or less than a second threshold number of antenna ports;
program code for causing a computer to determine frequency resources allocated for transmission of a data channel having a flexible symbol duration; and
program code for causing a computer to allocate the first plurality of frequency resources for transmission of the CSIRS based on the determined number of antenna ports and the frequency resources allocated for the transmission of the flexible data channel by setting the first plurality of frequency resources to include or correspond to the frequency resources allocated for the transmission of the flexible data channel when the number of antenna ports is equal to or less than the second threshold number of antenna ports.

19. The non-transitory computer-readable medium of claim 17, further comprising:
program code for causing a computer to set the first plurality of frequency resources to correspond to the frequency resources allocated for the transmission of control information when the number of antenna ports is equal to or less than the first threshold number of antenna ports.

20. The non-transitory computer-readable medium of claim 17, further comprising:
program code for causing a computer to determine whether the number of antenna ports is greater than the first threshold number of antenna ports and equal to or less than a second threshold number of antenna ports;
program code for causing a computer to determine frequency resources allocated for transmission of a demodulation reference signal (DMRS); and
program code for causing a computer to allocate the first plurality of frequency resources for transmission of the CSIRS based on the determined number of antenna ports and the frequency resources allocated for the transmission of the DMRS by setting the first plurality of frequency resources to include or correspond to the frequency resources allocated for the transmission of the DMRS when the number of antenna ports is greater than the first threshold number of antenna ports and equal to or less than the second threshold number of antenna ports.

21. The non-transitory computer-readable medium of claim 20, wherein the number of antenna ports corresponds to the number of antenna ports used for the transmission of the DMRS.

22. The non-transitory computer-readable medium of claim 21, wherein the second threshold number of antenna ports corresponds to a maximum number of antenna ports available for a DMRS transmission, and wherein the maximum number of antenna ports available for a DMRS transmission is determined based on a configuration of the DMRS.

23. The non-transitory computer-readable medium of claim 20, further comprising:
program code for causing a computer to determine whether the number of antenna ports is greater than the second threshold number of antenna ports; and
program code for causing a computer to allocate the first plurality of frequency resources for transmission of the CSIRS based on the determined number of antenna ports and the frequency resources allocated for the transmission of the DMRS by setting the first plurality of frequency resources to include or correspond to an entire number of frequency resources available for transmission of the CS IRS when the number of antenna ports is greater than the second threshold number of antenna ports.

24. An apparatus configured for wireless communication, the apparatus comprising:
at least one processor; and
a memory coupled to the at least one processor,
wherein the at least one processor is configured:
to determine a number of antenna ports to be used for wireless communication;
to determine whether the number of antenna ports is equal to or less than a first threshold number of antenna ports;
to determine frequency resources allocated for transmission of control information;
to allocate a first plurality of frequency resources for transmission of a channel state information reference signal (CSIRS) based on the determined number of antenna ports and the frequency resources allocated for the transmission of control information by setting the resources of the first plurality of frequency resources to include or correspond to the frequency resources allocated for the transmission of control information when the number of antenna ports is equal to or less than the first threshold number of antenna ports; and
to transmit the CSIRS over the first plurality of frequency resources.

25. The apparatus of claim 24, wherein the at least one processor is further configured:
to determine whether the number of antenna ports is equal to or less than a second threshold number of antenna ports;
to determine frequency resources allocated for transmission of a data channel having a flexible symbol duration; and
to allocate the first plurality of frequency resources for transmission of the CSIRS based on the determined number of antenna ports and the frequency resources allocated for the transmission of the flexible data channel by setting the first plurality of frequency resources to include or correspond to the frequency resources allocated for the transmission of the flexible data channel when the number of antenna ports is equal to or less than the second threshold number of antenna ports.

26. The apparatus of claim 24, wherein the at least one processor is further configured:
to set the first plurality of frequency resources to correspond to the frequency resources allocated for the transmission of control information when the number of antenna ports is equal to or less than the first threshold number of antenna ports.

27. The apparatus of claim 24, wherein the at least one processor is further configured:
to determine whether the number of antenna ports is greater than the first threshold number of antenna ports and equal to or less than a second threshold number of antenna ports;
to determine frequency resources allocated for transmission of a demodulation reference signal (DMRS); and to allocate the first plurality of frequency resources for transmission of the CSIRS based on the determined number of antenna ports and the frequency resources allocated for the transmission of the DMRS by setting the first plurality of frequency resources to include or correspond to the frequency resources allocated for the transmission of the DMRS when the number of antenna ports is greater than the first threshold number of antenna ports and equal to or less than the second threshold number of antenna ports.

28. The apparatus of claim 27, wherein the number of antenna ports corresponds to the number of antenna ports used for the transmission of the DMRS.

29. The apparatus of claim 28, wherein the second threshold number of antenna ports corresponds to a maximum number of antenna ports available for a DMRS transmission, and wherein the maximum number of antenna ports available for a DMRS transmission is determined based on a configuration of the DMRS.

30. The apparatus of claim 27, wherein the at least one processor is further configured:
- to determine whether the number of antenna ports is greater than the second threshold number of antenna ports; and
- to allocate the first plurality of frequency resources for transmission of the CSIRS based on the determined number of antenna ports and the frequency resources allocated for the transmission of the DMRS by setting the first plurality of frequency resources to include or correspond to an entire number of frequency resources available for transmission of the CSIRS when the number of antenna ports is greater than the second threshold number of antenna ports.

* * * * *